(12) United States Patent
Höppner et al.

(10) Patent No.: US 10,943,053 B2
(45) Date of Patent: Mar. 9, 2021

(54) METHOD AND A CIRCUIT FOR ADAPTIVE REGULATION OF BODY BIAS VOLTAGES CONTROLLING NMOS AND PMOS TRANSISTORS OF AN IC

(71) Applicant: RACYICS GMBH, Dresden (DE)

(72) Inventors: Sebastian Höppner, Dresden (DE); Dennis Walter, Dresden (DE)

(73) Assignee: RACYICS GMBH, Dresden (DE)

( * ) Notice: Subject to any disclaimer, the term of this patent is extended or adjusted under 35 U.S.C. 154(b) by 0 days.

(21) Appl. No.: 16/635,780

(22) PCT Filed: Jul. 11, 2018

(86) PCT No.: PCT/EP2018/068749
§ 371 (c)(1),
(2) Date: Jan. 31, 2020

(87) PCT Pub. No.: WO2019/025141
PCT Pub. Date: Feb. 7, 2019

(65) Prior Publication Data
US 2020/0379032 A1    Dec. 3, 2020

(30) Foreign Application Priority Data

Aug. 4, 2017   (DE) ......................... 102017117745.0
Aug. 4, 2017   (DE) ......................... 102017117772.8
(Continued)

(51) Int. Cl.
*G06F 17/50*      (2006.01)
*G01R 31/00*      (2006.01)
(Continued)

(52) U.S. Cl.
CPC ....... *G06F 30/398* (2020.01); *G01R 31/2856* (2013.01); *G01R 31/31725* (2013.01);
(Continued)

(58) Field of Classification Search
None
See application file for complete search history.

(56) References Cited

U.S. PATENT DOCUMENTS 7,941,675 B2 *  5/2011  Burr ...................... G06F 1/3203
                                                              713/300
7,949,864 B1 *  5/2011  Svilan .................. G06F 1/3296
                                                              713/1
(Continued)

FOREIGN PATENT DOCUMENTS

DE     102013206300 A1    10/2014

OTHER PUBLICATIONS

International Preliminary Report on Patentability issued in PCT/EP2018/068749 and dated Feb. 13, 2020.
(Continued)

*Primary Examiner* — Leigh M Garbowski
(74) *Attorney, Agent, or Firm* — Heslin Rothenberg Farley and Mesiti PC; Nicholas Mesiti (57) ABSTRACT

A method and a circuit for adaptive regulation of body bias voltages controlling nmos and pmos transistors of an integrated circuit includes a digital circuit, a counter, a control unit and a charge pump. A first ring oscillator monitor measures a period duration of nmos transistors and a second ring oscillator monitor measures a period duration of pmos transistors. A first closed control loop adaptively regulates the performance $c_n$ of the body bias controlled nmos transistors of the digital circuit by comparing the measured period duration of nmos dominated first ring oscillator monitor to a period duration of a reference clock and a second closed control loop adaptively regulating the performance $c_p$ of the body bias controlled pmos transistors of the digital circuit by comparing the measured period duration of
(Continued)

pmos dominated second ring oscillator monitor to the period duration of the reference clock.

18 Claims, 6 Drawing Sheets

(30) Foreign Application Priority Data

Aug. 22, 2017 (DE) .......................... 102017119111.9
Oct. 27, 2017 (DE) .......................... 102017125203.7

(51) Int. Cl.

| | |
|---|---|
| *G06F 30/398* | (2020.01) |
| *G01R 31/28* | (2006.01) |
| *G01R 31/317* | (2006.01) |
| *G06F 30/39* | (2020.01) |
| *H03K 3/03* | (2006.01) |
| *G05F 3/20* | (2006.01) |
| *G06F 30/30* | (2020.01) |
| *G06F 30/337* | (2020.01) |
| *G06F 30/3312* | (2020.01) |
| *G06F 119/12* | (2020.01) |
| *G06F 30/3308* | (2020.01) |

(52) U.S. Cl.
CPC .............. *G05F 3/205* (2013.01); *G06F 30/30* (2020.01); *G06F 30/337* (2020.01); *G06F 30/3312* (2020.01); *G06F 30/39* (2020.01); *H03K 3/0315* (2013.01); *G06F 30/3308* (2020.01); *G06F 2119/12* (2020.01)

(56) References Cited

U.S. PATENT DOCUMENTS

| | | | |
|---|---|---|---|
| 8,112,754 B2 | 2/2012 | Shikano | |
| 8,181,147 B2* | 5/2012 | Tang | G06F 30/36 |
| | | | 716/136 |
| 8,665,009 B2* | 3/2014 | Myers | H02M 3/07 |
| | | | 327/548 |
| 8,995,204 B2* | 3/2015 | Clark | G11C 11/412 |
| | | | 365/189.011 |
| 9,991,879 B2* | 6/2018 | Huang | H03K 5/19 |
| 2010/0333057 A1 | 12/2010 | Tang et al. | |
| 2011/0221029 A1 | 9/2011 | Svilan et al. | |
| 2012/0327725 A1 | 12/2012 | Clark et al. | |
| 2014/0035661 A1 | 2/2014 | Myers et al. | |

OTHER PUBLICATIONS

R. Carter et al., "22nm FDSOI Technology for Emerging Mobile, Internet-of-Things, and RF Applications", IEEE International Electron Devices Meeting (IEDM), San Francisco, CA., 2016, pp. 2.2.1-2.2.4.

Guerric de Streel et al., "SleepTalker: A ULV 802.15.4a IR-UWB Transmitter SoC in 28-nm FDSOI Achieving 14 pJ/b at 27 Mb/s With Channel Selection Based on Adaptive FBB and Digitally Programmable Pulse Shaping", IEEE Journal of Solid-State Circuits, vol. 52, No. 4, Apr. 2017, pp. 1163-1177.

James T. Kao et al., "A 175-mV Multiply-Accumulate Unit Using an Adaptive Supply Voltage and Body Bias Architecture", IEEE Journal of Solid-State Circuits, vol. 37, No. 11, Nov. 2002, pp. 1545-1554.

International Search Report and Written Opinion issued in PCT/EP2018/068749 and dated Oct. 15, 2018.

Hassan Mostafa, et al., "NBTI and Process Variations Compensation Circuits Using Adaptive Body Bias", IEEE Transactions on Semiconductor Manufacturing, vol. 25, No. 3, pp. 460-467, Aug. 2012.

Guerric de Streel et al., "Impact of Back Gate Biasing Schemes on Energy and Robustness of ULV Logic in 28nm UTBB FDSOI Technology", Proc. IEEE Int. Symp. Low Power Electron Design (ISLPED), Sep. 2013, pp. 255-260.

* cited by examiner

METHOD AND A CIRCUIT FOR ADAPTIVE REGULATION OF BODY BIAS VOLTAGES CONTROLLING NMOS AND PMOS TRANSISTORS OF AN IC

CROSS REFERENCE TO RELATED APPLICATIONS

This application is the National Phase filing under 35 U.S.C. § 371 of International Application No. PCT/EP2018/068749, filed on Jul. 11, 2018, and published on Feb. 7, 2019 as WO 2019/025141 A1, which claims priority to German Application No. 102017117772.8, filed on Aug. 4, 2017, and German Application No. 102017117745.0, filed on Aug. 4, 2017, and German Application No. 102017119111.9, filed on Aug. 22, 2017, and German Application No. 102017125203.7, filed Oct. 27, 2017. The contents of each of the prior applications are hereby incorporated by reference herein in their entirety.

The invention discloses a method and a circuit for adaptive regulation of body bias voltages controlling nmos and pmos transistors of an integrated circuit.

BACKGROUND

Background of the invention is the adaptive regulation of body bias voltages in silicon-on-insulator (SOI) CMOS technologies. An overview of the Silicon-on-Insulator (SOI) CMOS technologies is exemplary published in R. Carter et al., "22 nm FDSOI technology for emerging mobile, Internet-of-Things, and RF applications," 2016 IEEE International Electron Devices Meeting (IEDM), San Francisco, Calif., 2016, pp. 2.2.1-2.2.4. doi: 10.1109/IEDM.2016.7838029. These technologies allow the adaptation of the threshold voltage of transistors by adjusting the body bias (back-gate) voltage as it is disclosed in G. de Streel and D. Bol, "Impact of back gate biasing schemes on energy and robustness of ULV logic in 28 nm UTBB FDSOI technology," in Proc. IEEE Int. Symp. Low Power Electron. Design (ISLPED), September 2013, pp. 255-260.

The adaptation of the body bias voltage can be done during operation of the circuit in order to compensate variations in the fabrication process (P), of the supply voltage (V) and of the temperature (T) in order to achieve a defined delay time and/or leakage current consumption. The adaptation of the body bias threshold voltage is necessary to adjust an adaptive compromise between switching speed and leakage current consumption in order to be able to adapt the circuit or system with regard to the performance requirement. In U.S. Pat. No. 8,112,754 B2, a method for controlling the body-bias voltage and clock frequency in a multi-processor system for processing tasks is disclosed, but the body-bias voltages are controlled as a whole, there is no consideration of pmos and nmos transistors variability of an integrated circuit.

In US20100333057A1, a method for controlling the body-bias voltage based on a closed loop regulation using a microcontroller circuit is disclosed. It is based on critical path delay monitors which sense the total delay but do not consider the individual pmos and nmos transistors variability of an integrated circuit.

In the prior art, which is hitherto known, the operation of the circuit is carried out without the consideration of body biasing, e.g. by connection of the body bias voltages to the VDD or VSS supply nets or to ground potential. Or the operation of the circuit is carried out with fixed body bias voltages, whereas an adaption of the body bias voltages during operation could not be carried out. It is also known to regulate the body bias voltages based on the performance of the target circuit (such as a functionally-used oscillator as described in G. de Streel et al., "SleepTalker: A ULV 802.15.4a IR-UWB Transmitter SoC in 28-nm FDSOI Achieving 14 pJ/b at 27 Mb/s With Channel Selection Based on Adaptive FBB and Digitally Programmable Pulse Shaping," in IEEE Journal of Solid-State Circuits, vol. 52, no. 4, pp. 1163-1177, April 2017. doi: 10.1109/JSSC.2016.2645607), or dedicated circuits that selectively monitor the performance (e.g., switching speed, leakage current consumption) of pmos and nmos transistors. These may also be hardware performance monitor circuits which monitor specific, critical timing of an integrated circuit (see DE 102013206300 B4 or M. Miyazaki, J. Kao, A. Chandrakasan, "A 175 mV Multiply-Accumulate Unit using an Adaptive Supply Voltage and Body Bias (ASB) Architecture," ISSCC February 2002).

In US 20110221029 A1, a method for a balanced adaptive body bias control is disclosed, whereas a closed-loop control of the body bias voltages of the cell of a circuit (VPW (p-well voltage) and VNW (n-well voltage)) is proposed using three separate monitors. In this case, a first monitor is selective on the performance of the circuit, a second monitor is selective on the pmos performance of the pmos transistor properties and a third monitor is selective on the nmos performance of the nmos transistor properties. The control proposed in US 20110221029 A1 is based on adapting VNW and VPW in a closed loop so that the performance of the first monitor corresponds to a target or set value and the ratio of the performance of the second and third monitors corresponds to a different target value.

The known possibilities of adaptation of the threshold voltage of transistors by adjusting the body bias (back-gate) voltage (especially in US 20110221029 A1) have the problem that the circuit of adaptation the body bias voltage is not sensitive ONLY to one of the performances of nmos and pmos transistor properties. The solution in US 20110221029 A1 requires separate monitor circuits, whereas hardware performance monitors (HPM) generally require a calibration in the production test, resulting in increased test costs.

It is therefore the objective of the present invention to provide a method and a circuit for adaptation of the switching speed and hence to find a trade-off between delay time and leakage current consumption, whereas variations of process (P), supply voltage (V) and temperature (T) can be compensated and an equal performance, or a defined ratio of nmos and pmos transistors over all PVT conditions can be realized.

SUMMARY OF THE INVENTION

The objective of the invention will be solved by a circuit for adaptive regulation of body bias voltages controlling nmos and pmos transistors of an integrated circuit comprising a digital circuit, a counter, a control unit and a charge pump, whereas the digital circuit comprises two ring oscillator monitors connected to the controlled body bias voltages of n-well and p-well contacts of transistors of the digital circuit, a first ring oscillator monitor measures a period duration of nmos transistors and a second ring oscillator monitor measures a period duration of pmos transistors, wherein a first closed control loop is formed by the control unit, the counter, the charge pump and the first ring oscillator monitor adaptively regulating the performance cn of the body bias controlled nmos transistors of the digital circuit by comparing the measured period duration of nmos dominated first ring oscillator monitor to a period duration of a reference clock and a second closed control loop is formed by the control unit, the counter, the charge pump and the second ring oscillator monitor adaptively regulating the performance cp of the body bias controlled pmos transistors of the digital circuit by comparing the measured period duration of pmos dominated second ring oscillator monitor to the period duration of the reference clock.

Hence, two separate ring oscillator monitors are used for monitoring the performance of the digital circuit. The ring oscillator monitors are sensitive to the properties of nmos and pmos transistors, i.e. their oscillation frequency is dominated in each case by the switching times of nmos and pmos transistors. But, unlike the prior art, the oscillators do not have to depend exclusively on the nmos and pmos properties, respectively but are dominated by the nmos or pmos properties. It is therefore advantageous that the n-well and p-well body bias voltages, which control the performance of the nmos and pmos transistors can be determined adaptively and separately from each other.

In a Forward Body Bias (FBB) scheme the pmos transistor properties are controlled by the p-well body bias voltage and the nmos transistor properties are controlled by the n-well body bias voltage.

In a Reverse Body Bias (RBB) scheme the pmos transistor properties are controlled by the n-well body bias voltage and the nmos transistor properties are controlled by the p-well body bias voltage.

In a preferred embodiment of the inventive circuit, the nmos dominated first ring oscillator monitor comprises N-input NAND gates with N nmos transistors in series in a pull-down path and N pmos transistors in parallel in a pull-up path in the integrated circuit. This is advantageous because the delay from gate input to output of a falling signal edge at the output of the NAND gate is larger than the delay of a rising edge at the output of the gate. Thereby the oscillation frequency of the oscillator is dominated by falling edge delays which depend on the nmos device/transistor properties.

In another preferred embodiment of the inventive circuit, the pmos dominated second ring oscillator monitor comprises K-input NOR gates with K nmos transistors in parallel in a pull-down path and K pmos transistors in series in a pull-up path in the integrated circuit. This is advantageous because the delay from gate input to output of a rising signal edge at the output of the NOR gate is larger than the delay of a falling edge at the output of the gate. Thereby the oscillation frequency of the oscillator is dominated by rising edge delays which depend on the pmos device/transistor properties.

In a further embodiment of the inventive circuit, the first closed control loop and the second closed control loop, each comprises a separate counter for measuring the period of the oscillators dominated by the nmos and pmos transistors properties, respectively. The counter is used for measuring the performance of the oscillators compared to a reference frequency. The counter values cn and cp are determined based on the ratio of the period durations of nmos and pmos dominated ring oscillator monitors to the period of the reference clock, ergo cn=Tref/Tro,nmos and cp=Tref/Tro,pmos. Tro,nmos is the period duration of the nmos dominated first ring oscillator monitor and Tro,pmos is the period duration of the pmos dominated second ring oscillator monitor. Tref is the period duration of the reference clock.

In another embodiment of the inventive circuit, the counter comprises an input-multiplexer for sequentially measuring the period of the oscillators dominated by the nmos and pmos transistors. This has the advantage that only one counter circuit has to be implemented. This saves chip area and reduces the overall power consumption.

In an embodiment of the inventive circuit, the ring oscillator monitors are built from standard digital cells. By using of standard digital cells to implement the ring oscillator monitors, there is no need to integrate or implement specific monitor circuits which are purely selective for nmos and pmos transistor properties.

The advantage of the inventive circuit is the parallel and independent execution of control loops to control n-well (VNW) and p-well (VPW) voltages using frequency counter results for nmos and pmos dominated ring oscillator monitors.

The objective of the invention will also be solved by a method for adaptive regulation of body bias voltages controlling nmos and pmos transistors of an integrated circuit using the inventive circuit, whereas the method comprising the following steps:

connecting a first and second ring oscillator monitor to the controlled body bias voltages of n-well (VNW) and p-well (VPW) contacts of transistors of a digital circuit, counting a period duration of the nmos and/or pmos dominated first and/or second ring oscillator monitor by a counter, determining a performance $c_n$ or $c_p$ of n-well or p-well body bias controlled nmos or pmos transistors of the digital circuit by comparing the measured period duration of nmos or pmos dominated first or second ring oscillator monitor to a period duration of a reference clock, comparing the determined performance $c_n$ or $c_p$ with set values $c_{n,0}$ or $c_{p,0}$, regulating the n-well or p-well body bias controlled nmos or pmos transistors of the digital circuit until the set value is reached or a desired ratio of $c_n/c_p$ is achieved.

As stated above, the performance $c_n$ of the body bias controlled nmos transistors of the digital circuit is defined by cn=Tref/Tro,nmos, wherein Tro,nmos is the period duration measured by the first nmos dominated ring oscillator monitor, and the performance cp of the body bias controlled pmos transistors of the digital circuit is defined by cp=Tref/Tro, pmos, wherein Tro,pmos is the period duration measured by the second pmos dominated ring oscillator monitor.

By applying the inventive method in a Forward Body Biasing (FBB) configuration the n-well body bias voltage controlling the nmos transistors of the digital circuit is increased if cn<cn,0, otherwise it is decreased by the first closed control loop and the p-well body bias voltage controlling the pmos transistors of the digital circuit is decreased if cp<cp,0, otherwise it is increased by the second closed control loop. In the FBB configuration the nmos transistor performance depends on the n-well body bias voltage and the pmos transistor performance depends on the p-well body bias voltage, which is typically <0V. Thereby, an adaptively regulation of the n-well and p-well body bias voltages can be achieved during operation of the circuit.

By applying the inventive method in a Reverse Body Biasing (RBB) configuration the n-well body bias voltage controlling the pmos transistors of the digital circuit is decreased if cp<cp,0, otherwise it is increased by the first closed control loop and the p-well body bias voltage controlling the pmos transistors of the digital circuit is increased if cn<cn,0, otherwise it is decreased by the second closed control loop. In the RBB configuration the nmos transistor performance depends on the p-well body bias voltage, which is typically <0V, and the pmos transistor performance depends on the n-well body bias voltage. Thereby, also an adaptively regulation of the n-well and p-well body bias voltages can be achieved during operation of the circuit.

In a further preferred embodiment of the inventive method, the set values $c_{n,0}$ and $c_{p,0}$ are determined by circuit simulation in a design process of the integrated circuit.

In another embodiment of the inventive method, the desired ratio cr is a defined ratio of nmos and pmos transistor's switching speed.

The determination of the set values through circuit simulation can be performed according to selectable criteria. Possible criteria may e.g. be a target period duration like Tro,nmos,0 or Tro,pmos,0, or a ratio of nmos and pmos transistor's switching speed. For example, cr=Tro,nmos/Tro,pmos can be chosen so that clock driver cells with the respective ratio of nmos and pmos driver strength have the same delay time for rising and falling clock edge.

The invention will be explained in more detail using exemplary embodiments.

BRIEF DESCRIPTION OF THE DRAWING FIGURES

The appended drawings show

DETAILED DESCRIPTION

Figure 1:
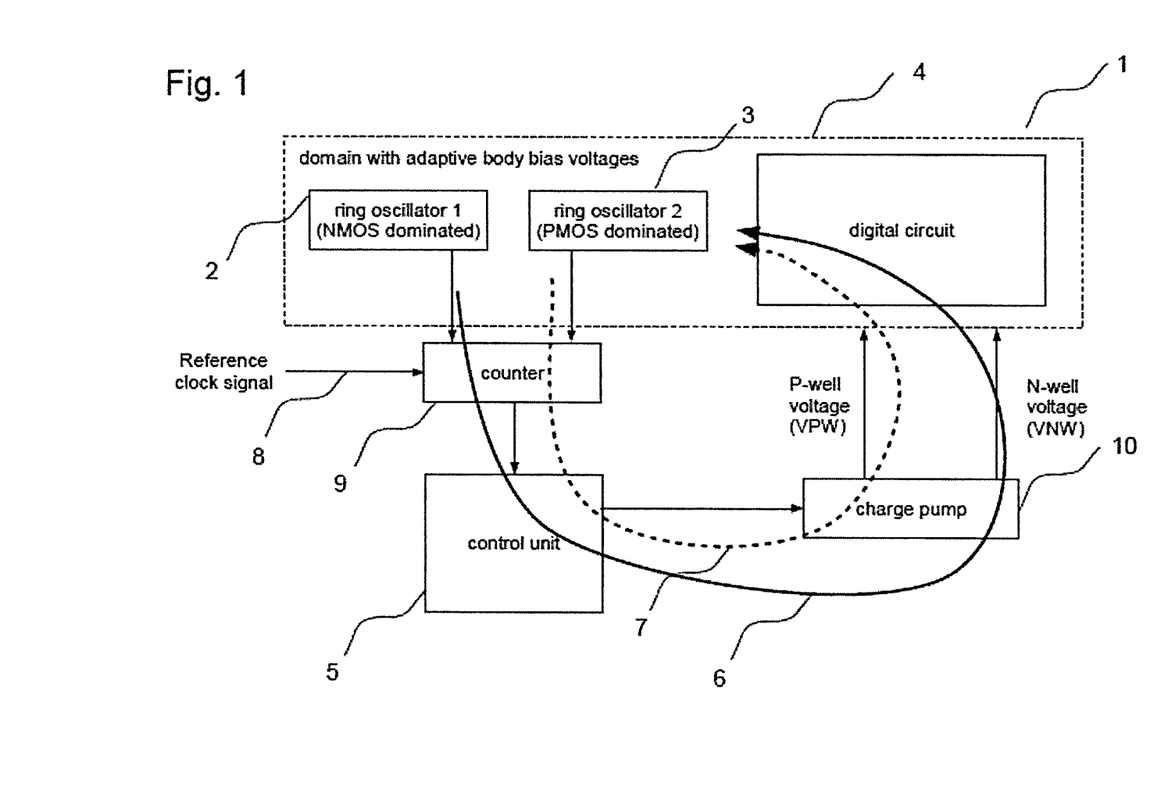
FIG. 1 Block diagram of the circuit for adaptive control of n-well and p-well body bias voltages.

FIG. 1 shows the inventive circuit adaptive control of n-well and p-well body bias voltages of an integrated circuit 1. The circuit comprises a digital circuit 4, a counter 9, a control unit 5 and a charge pump 10. The digital circuit 4 comprises two ring oscillator monitors 2, 3 connected to the controlled body bias voltages of n-well and p-well contacts of transistors of the digital circuit 4, a first ring oscillator monitor 2 measuring a period duration of nmos transistors and a second ring oscillator monitor 3 measuring a period duration of pmos transistors. A first closed control loop 6 is formed by the control unit 5, the counter 9, the charge pump 10 and the first ring oscillator monitor 2 adaptively regulating the performance $c_n$ of the body bias controlled nmos transistors of the digital circuit 4 by comparing the measured period duration of nmos dominated first ring oscillator monitor 2 to a period duration of a reference clock 8 and a second closed control loop 7 is formed by the control unit 5, the counter 9, the charge pump 10 and the second ring oscillator monitor adaptively regulating the performance $c_p$ of the body bias controlled pmos transistors of the digital circuit 4 by comparing the measured period duration of pmos dominated second ring oscillator monitor 3 to the period duration of the reference clock 8.

The closed loop permits to adapt and maintain the body bias control voltages in the necessary ranges without taking into account the actual value of the body bias voltages.

An essential advantage of the present circuit 1 is that the required reference signals so far can be reduced to only one single reference clock signal 8, which is used to regulate the body bias voltages in such a range that the target performance will be reached or fulfilled.

It is also advantageous that the closed control loops 6, 7 can be implemented within the integrated circuit 1. This saves chip area and reduces the overall power consumption.

Figure 2:
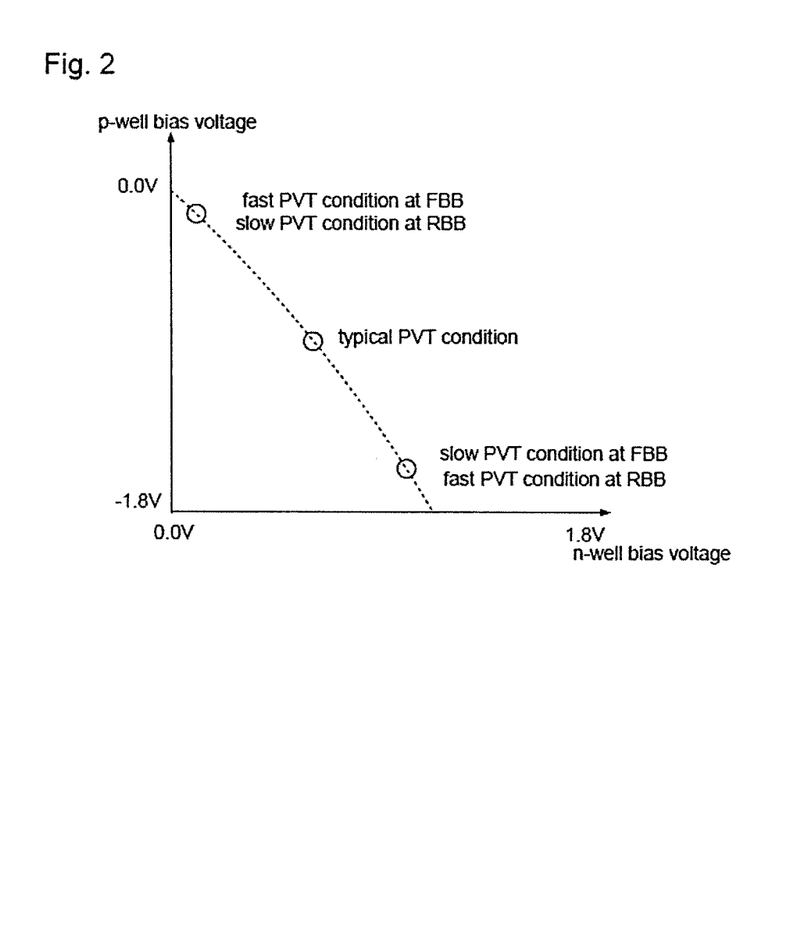
FIG. 2 Illustration of Body Biasing, adaption of VNW (n-well-bias) and VPW (p-well-bias) to control a performance.

FIG. 2 illustrates the body biasing and the adaption of the n-well bias and p-well bias for regulation of the performance of a cell. It shows the VNW (x-axis) indicating the controlled body bias voltages of the n-well contacts of transistors of the digital circuit and VPW (y-axis) indicating the controlled body bias voltages of the p-well contacts of transistors of the digital circuit plane. For a given performance (e.g. rising edge delay or falling edge delay of a clock inverter cell) its value depends on both VNW and VPW, and the PVT condition. As additional constraint, the match between two performances, e.g. rising edge delay of a clock inverter cell equals falling edge delay of a clock inverter cell can be defined. This results in a relation between VNW and VPW (drawn line) which must be fulfilled. An adaptive body bias regulation scheme (circuit) can meet this constraint adaptively during system operation.

Fulfilling the nominal performance criterion at a typical PVT condition, as example, results in the nominal VNW VPW values.

In case the PVT condition is slow for timing, the VNW/VPW voltages have: absolute higher values in case of forward body biasing (FBB), absolute lower values in case of reverse body biasing (RBB).

In case the PVT condition is fast for timing, the VNW/VPW voltages have: absolute lower values in case of forward body biasing (FBB), absolute higher values in case of reverse body biasing (RBB).

Figure 3:
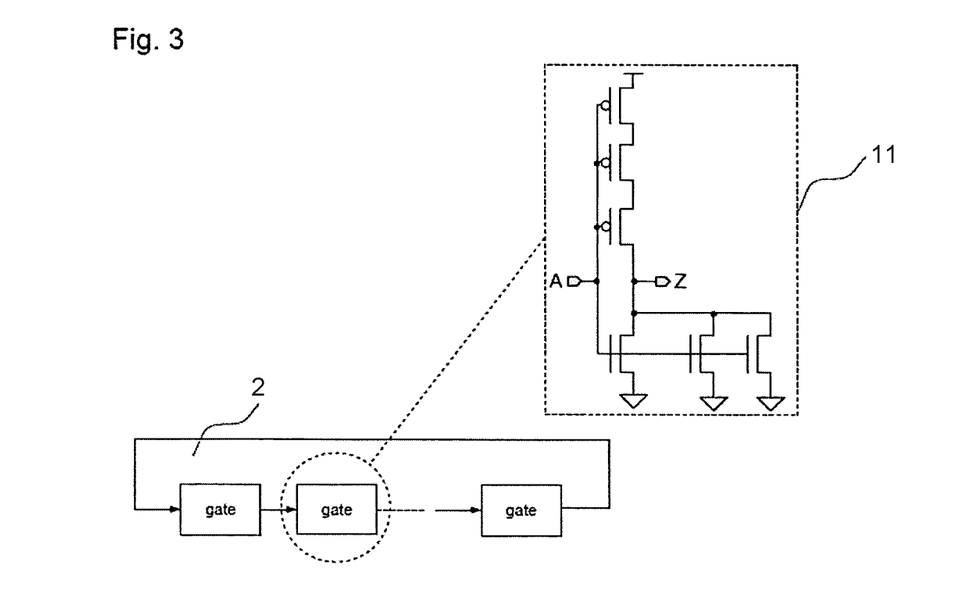
FIG. 3 nmos dominated ring oscillator monitor built from NAND3 standard cells.

FIG. 3 shows an embodiment of an nmos dominated ring oscillator monitor 2 built from NAND3 standard cells 11.

Figure 4:
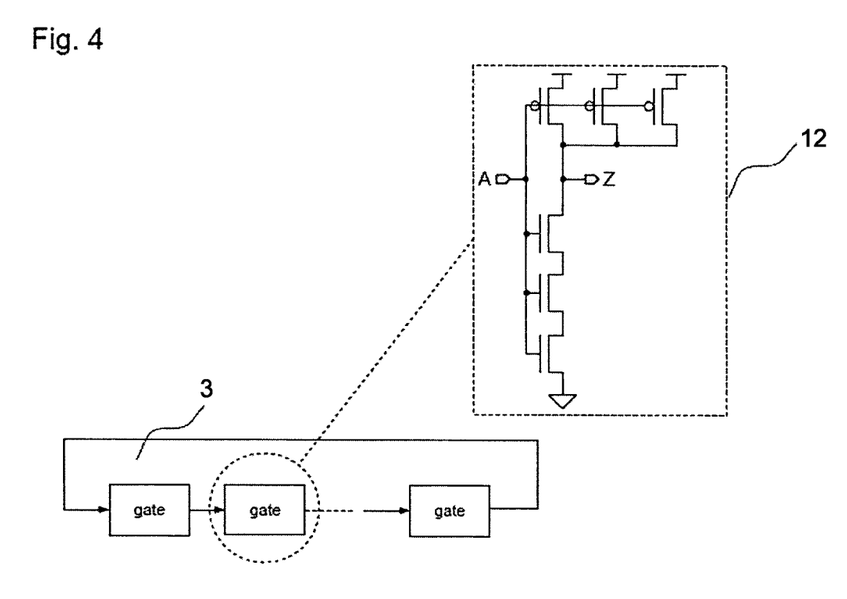
FIG. 4 pmos dominated ring oscillator monitor built from NOR3 standard cells.

FIG. 4 shows an embodiment of a pmos dominated ring oscillator monitor 3 built from NOR3 standard cells 12.

Figure 5:
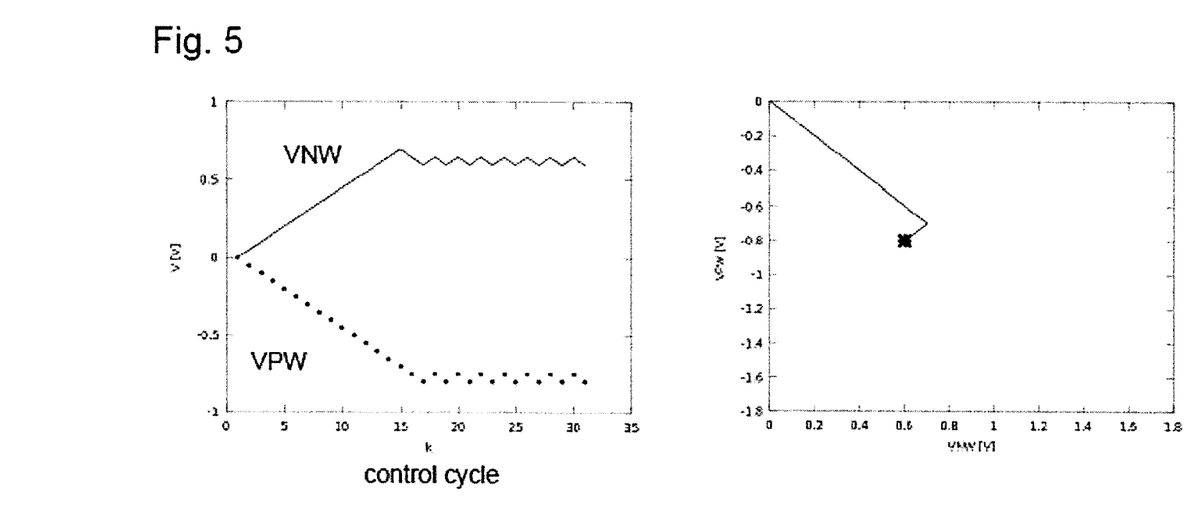
FIG. 5 Illustration of the control behavior of n-well and p-well body bias voltages.

FIG. 5 shows an illustration of the control behavior of n-well and p-well body bias voltages. It can be seen that both n-well body bias voltage (VNW) and p-well body bias voltage (VPW) change their value with increasing time and number of control cycles. Both body bias voltages settle at an non-zero target point, at which the pmos transistor performance cp and nmos transistor performance cn match their reference values $c_{p,0}$ and $c_{n,0}$.

Figure 6:
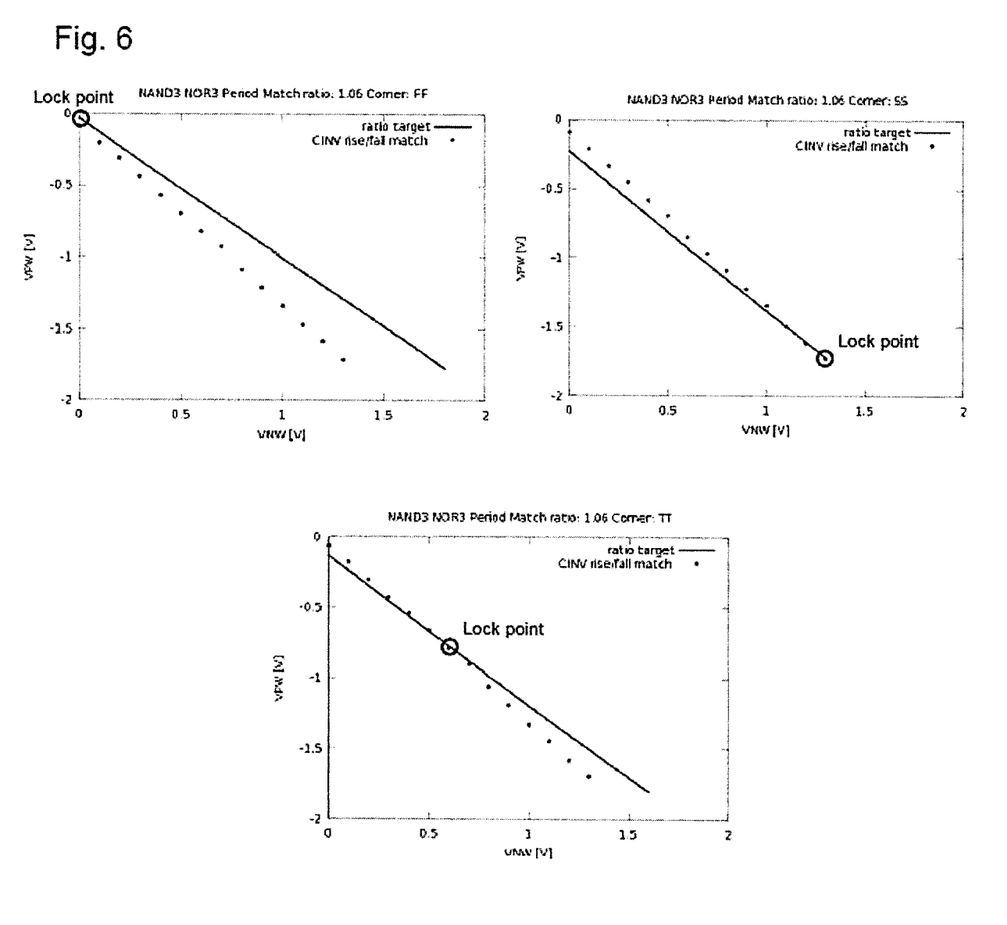
FIG. 6 Illustration of the n-well and p-well body bias voltage regulation results.

FIG. 6 shows an example simulation result of the target values for n-well body bias voltage (VNW) and p-well body bias voltage (VPW) regulation results. The parameter is the pmos transistor performance cp. The nmos transistor performance is given by cn=cp/cr, where cr is the targeted performance ratio of pmos and nmos transistors. The solid line denotes the regulation result by the inventive method. The dotted line denotes the simulation result of a clock inverter reference cell where it matches the targeted performance ratio of pmos and nmos transistors. The circle indicates the target lock point of the inventive adaptive body bias method, where cp=$c_{p,0}$ and cn=$c_{n,0}$. The simulation results are shown for three different process variation examples of FF (fast nmos, fast pmos), SS (slow nmos, slow pmos) and TT (typical nmos, typical pmos). It can be seen that by the inventive method at the target lock point (circle), the targeted performance ratio of pmos and nmos transistors is met and matching with the ideal clock inverter reference cell simulation result (dottet line).

LIST OF REFERENCE SIGNS 1 integrated circuit
2 first nmos dominated ring oscillator monitor
3 second pmos dominated ring oscillator monitor
4 digital circuit
5 control unit
6 first closed control loop
7 second closed control loop
8 reference clock signal
9 counter
10 charge pump
11 NAND3
12 NOR3

The invention claimed is:

1. A circuit for adaptive regulation of body bias voltages controlling nmos and pmos transistors of an integrated circuit comprising:
   a digital circuit;
   a counter;
   a control unit;
   and a charge pump;
   wherein the digital circuit comprises two ring oscillator monitors connected to the controlled body bias voltages of n-well and p-well contacts of transistors of the digital circuit, a first ring oscillator monitor to measure a period duration of nmos transistors and a second ring oscillator monitor to measure a period duration of pmos transistors,
   wherein a first closed control loop is formed by the control unit, the counter, the charge pump and the first ring oscillator monitor to adaptively regulate the performance $c_n$ of the body bias controlled nmos transistors of the digital circuit by comparing a measured period duration of nmos dominated first ring oscillator monitor to a period duration of a reference clock and a second closed control loop is formed by the control unit, the counter, the charge pump and the second ring oscillator monitor to adaptively regulate the performance $c_p$ of the body bias controlled pmos transistors of the digital circuit by comparing a measured period duration of pmos dominated second ring oscillator monitor to the period duration of the reference clock.

2. The circuit for adaptive regulation of body bias voltages controlling nmos and pmos transistors of an integrated circuit according to claim 1, wherein the nmos dominated first ring oscillator monitor comprises N-input NAND gates with N nmos transistors in series in a pull-down path and N pmos transistors in parallel in a pull-up path in the integrated circuit.

3. The circuit for adaptive regulation of body bias voltages controlling nmos and pmos transistors of an integrated circuit according to claim 2, wherein the pmos dominated second ring oscillator monitor comprises K-input NOR gates with K nmos transistors in parallel in a pull-down path and K nmos transistors in series in a pull-up path in the integrated circuit.

4. The circuit for adaptive regulation of body bias voltages controlling nmos and pmos transistors of an integrated circuit according to claim 1, wherein the pmos dominated second ring oscillator monitor comprises K-input NOR gates with K nmos transistors in parallel in a pull-down path and K nmos transistors in series in a pull-up path in the integrated circuit.

5. The circuit for adaptive regulation of body bias voltages controlling nmos and pmos transistors of an integrated circuit according to claim 4, wherein the first closed control loop and the second closed control loop, each comprises a separate counter for measuring the period of the oscillators dominated by the nmos and/or pmos transistors.

6. The circuit for adaptive regulation of body bias voltages controlling nmos and pmos transistors of an integrated circuit according to claim 5, wherein the counter comprises an input-multiplexer for sequentially measuring the period of the oscillators dominated by the nmos and pmos transistors.

7. The circuit for adaptive regulation of body bias voltages controlling nmos and pmos transistors of an integrated circuit according to claim 6, wherein the ring oscillator monitors are built from standard digital cells.

8. The circuit for adaptive regulation of body bias voltages controlling nmos and pmos transistors of an integrated circuit according to claim 1, wherein the first closed control loop and the second closed control loop, each comprises a separate counter for measuring the period of the oscillators dominated by the nmos and/or pmos transistors.

9. The circuit for adaptive regulation of body bias voltages controlling nmos and pmos transistors of an integrated circuit according to claim 1, wherein the counter comprises an input-multiplexer for sequentially measuring the period of the oscillators dominated by the nmos and pmos transistors.

10. The circuit for adaptive regulation of body bias voltages controlling nmos and pmos transistors of an integrated circuit according to claim 1, wherein the ring oscillator monitors are built from standard digital cells.

11. A method for adaptive regulation of body bias voltages controlling nmos and pmos transistors of an integrated circuit using the circuit according to claim 1, wherein the method comprising the following steps:
    connecting a first and second ring oscillator monitor to controlled body bias voltages of n-well and p-well contacts of transistors of a digital circuit,
    counting a period duration of the nmos and/or pmos dominated first and/or second ring oscillator monitor by a counter,
    determining a performance cn or cp of n-well or p-well body bias controlled nmos or pmos transistors of the digital circuit by comparing the measured period duration of nmos or pmos dominated first or second ring oscillator monitor to a period duration of a reference clock,
    comparing the determined performance cn or cp with set values cn,0 or cp,0
    regulating the n-well or p-well body bias controlled nmos or pmos transistors of the digital circuit until the set value is reached or a desired ratio of cr=cp/cn is achieved.

12. The method for adaptive regulation of body bias voltages controlling nmos and pmos transistors of an integrated circuit according to claim 11, wherein in a Forward Body Biasing (FBB) configuration the n-well body bias voltage controlling the nmos transistors of the digital circuit is increased if cn<cn,0, otherwise it is decreased by the first closed control loop and the p-well body bias voltage controlling the pmos transistors of the digital circuit is decreased if cp<cp,0, otherwise it is increased by the second closed control loop.

13. The method for adaptive regulation of body bias voltages controlling nmos and pmos transistors of an integrated circuit according to claim 12, wherein in a Reverse Body Biasing (RBB) configuration the n-well body bias voltage controlling the pmos transistors of the digital circuit is decreased if cp<cp,0, otherwise it is increased by the first closed control loop and the p-well body bias voltage controlling the nmos transistors of the digital circuit is increased if cn<cn,0, otherwise it is decreased by the second closed control loop.

14. The method for adaptive regulation of body bias voltages controlling nmos and pmos transistors of an integrated circuit according to claim 13, wherein the set values cn,0 and cp,0 are determined by circuit simulation in a design process of the integrated circuit.

15. The method for adaptive regulation of body bias voltages controlling nmos and pmos transistors of an integrated circuit according to claim 14, wherein the desired ration cr is a defined ratio of nmos and pmos switching speed.

16. The method for adaptive regulation of body bias voltages controlling nmos and pmos transistors of an integrated circuit according to claim 11, wherein in a Reverse Body Biasing (RBB) configuration the n-well body bias voltage controlling the pmos transistors of the digital circuit is decreased if cp<cp,0, otherwise it is increased by the first closed control loop and the p-well body bias voltage controlling the nmos transistors of the digital circuit is increased if cn<cn,0, otherwise it is decreased by the second closed control loop.

17. The method for adaptive regulation of body bias voltages controlling nmos and pmos transistors of an integrated circuit according to claim 11, wherein the set values cn,0 and cp,0 are determined by circuit simulation in a design process of the integrated circuit.

18. The method for adaptive regulation of body bias voltages controlling nmos and pmos transistors of an integrated circuit according to claim 11, wherein the desired ration cr is a defined ratio of nmos and pmos switching speed.

* * * * *